United States Patent
Chen et al.

(10) Patent No.: US 10,216,331 B2
(45) Date of Patent: Feb. 26, 2019

(54) TOUCH PROJECTION SYSTEM AND TOUCH SENSITIVITY ADJUSTING METHOD THEREOF

(71) Applicant: Coretronic Corporation, Hsin-Chu (TW)

(72) Inventors: Yung-Chih Chen, Hsin-Chu (TW); Je-Fu Cheng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 232 days.

(21) Appl. No.: 15/428,161

(22) Filed: Feb. 9, 2017

(65) Prior Publication Data

US 2017/0235425 A1    Aug. 17, 2017

(30) Foreign Application Priority Data

Feb. 16, 2016   (CN) .......................... 2016 1 0086826

(51) Int. Cl.
  *G06F 3/041* (2006.01)
  *G06F 3/042* (2006.01)

(52) U.S. Cl.
  CPC .......... *G06F 3/0418* (2013.01); *G06F 3/0421* (2013.01); *G06F 3/0425* (2013.01)

(58) Field of Classification Search
  CPC .... G06F 3/0418; G06F 3/0425; G06F 3/0421; H04N 1/00249; H04N 1/00267; H04N 5/74; H04N 5/7408; H04N 5/7475; H04N 9/31
  USPC ................................................ 345/173, 175
  See application file for complete search history.

(56) References Cited

U.S. PATENT DOCUMENTS

| | | | | |
|---|---|---|---|---|
| 6,110,039 A * | 8/2000 | Oh | .......................... | A63F 13/04 463/2 |
| 6,146,278 A * | 11/2000 | Kobayashi | .............. | A63F 13/04 345/156 |
| 8,913,003 B2 * | 12/2014 | Grunnet-Jepsen | .... | G06F 3/0421 345/156 |
| 9,335,158 B2 * | 5/2016 | Yamagiwa | ............. | G01B 11/14 |
| 9,400,562 B2 * | 7/2016 | Takazawa | ............... | G06F 3/017 |
| 9,535,538 B2 * | 1/2017 | Yagishita | .............. | G06F 3/0425 |
| 9,600,100 B2 * | 3/2017 | Taylor | ................... | G06F 3/0425 |
| 9,690,427 B2 * | 6/2017 | Ono | ........................ | G06F 3/042 |

(Continued)

FOREIGN PATENT DOCUMENTS

| | | |
|---|---|---|
| CN | 202257528 | 5/2012 |
| CN | 103329079 | 9/2013 |
| CN | 203480408 | 3/2014 |

*Primary Examiner* — Jason M Mandeville
(74) *Attorney, Agent, or Firm* — JCIPRNET (57) ABSTRACT

A touch projection system and a touch sensitivity adjusting method thereof are provided. A size of a projected image provided on a screen is varied by the touch projection system according to a distance between a projection apparatus and the screen. The method includes following steps. An image frame including two light spots formed by first and second light sources is captured, and the two light spots are being detected to calculate by a distance therebetween in the image frame. The size of the projected image corresponding to the distance between the two light spots in the image frame is determined according to a look-up table. A sensitivity of a light detecting apparatus performing a touch detection on the projected image is adjusted according to the size of the projected image.

19 Claims, 4 Drawing Sheets

(56) References Cited

U.S. PATENT DOCUMENTS

| | | | |
|---|---|---|---|
| 2008/0111793 A1* | 5/2008 | Peters | G06F 3/0425 345/173 |
| 2012/0127323 A1* | 5/2012 | Kasuya | G03B 17/54 348/189 |
| 2014/0198030 A1* | 7/2014 | Takazawa | G06F 3/017 345/156 |
| 2015/0123899 A1* | 5/2015 | Taylor | G06F 3/0425 345/157 |
| 2015/0199071 A1* | 7/2015 | Hou | G06F 3/0416 345/175 |

* cited by examiner

TOUCH PROJECTION SYSTEM AND TOUCH SENSITIVITY ADJUSTING METHOD THEREOF

CROSS-REFERENCE TO RELATED APPLICATION

This application claims the priority benefit of China application serial no. 201610086826.3, filed on Feb. 16, 2016. The entirety of the above-mentioned patent application is hereby incorporated by reference herein and made a part of this specification.

BACKGROUND OF THE INVENTION

1. Field of the Invention

The invention generally relates to a touch technology, and more particularly, to a touch projection system and a touch sensitivity adjusting method thereof.

2. Description of Related Art

Interactive projection technology is a technology enabling a user to perform a touch operation on a projected image, and it uses an invisible light curtain (e.g., an infrared light curtain) generated by an invisible light emitter (e.g., a laser emitter or laser diodes) to cover the entire projected image. When a touch object contacts the invisible light curtain and reflects or blocks an invisible light beam of the invisible light curtain, an image frame capturing apparatus can capture an image frame and then determine a position of the touch object in the image frame so as to perform a touch function.

In the current interactive projection technology, when a projector moves relative to the screen in arrangement, a size of a projected image provided by the projector on the screen can vary according to a distance of the projector with respect to the screen. When the projector is relatively farther away from the screen, the size of the projected image provided by the projector is larger, while when the projector is relatively close to the screen, the size of the projected image provided by the projector is relatively smaller. In the other hand, based on requirements of safety regulations, the power of the invisible light emitter is generally designed as a fixed value, and thus, when the projector is relatively farther away from the screen to cause the projected image to be larger, a requirement for the touch sensitivity must be higher. However, conventional technology is unable to accurately obtain the size of the projected image, and thus is unable to effectively provide suitable touch sensitivity. Even through the image frame capturing apparatus is generally fixedly disposed on the projector, since a range capable for the image frame capturing apparatus to capture an image frame is also influenced by a distance between the image frame capturing apparatus and the screen, it is also unable to accurately know the size of the projected image simply through the image frame capturing apparatus.

The information disclosed in the "Description of Related Art" section is only for enhancement of understanding of the background of the described technology, and therefore it may contain information that does not form the prior art already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY OF THE INVENTION

The invention provides a touch projection system and a touch sensitivity adjusting method thereof, which can determine a size of a projected image and automatically adjust a touch sensitivity of the touch projection system in correspondence, so as to enhance the accuracy of touch detection.

Other objectives and advantages of the invention may be further understood from the technical features disclosed in the invention.

To achieve one, a part, all of the above objectives or other objectives, one embodiment of the invention provides a touch projection system which includes a projection apparatus, an invisible light emitter, at least two light emitting apparatuses, a light detecting apparatus and a processing unit. The projection apparatus is adapted to provide a projected image on a screen, wherein a size of the projected image varies according to a distance between a projection apparatus and the screen. The invisible light emitter is adapted to generate an invisible light curtain parallel to the screen and form a touch area corresponding to the projected image. The light emitting apparatuses form a first light source and a second light source for generating fixed light beams. The light detecting apparatus is disposed on the projection apparatus and captures the image frame, wherein the image frame includes two light spots respectively formed by the first light source and the second light source and the projected image, and the two light spots have a distance therebetween. The processing unit is coupled to the projection apparatus and the light detecting apparatus, wherein the processing unit is adapted to transmit a signal corresponding to the image frame to the processing unit, and the processing unit is adapted to calculate the distance between the two light spots in the image frame, determines the size of the projected image corresponding to the distance according to a look-up table, and adjusts a sensitivity of the light detecting apparatus performing a touch detection on the projected image according to the size of the projected image.

To achieve one, a part, all of the above objectives or other objectives, one embodiment of the invention provides a touch sensitivity adjusting method of a touch projection system, and the touch projection system comprises a screen, a projection apparatus and a light detecting apparatus, wherein a size of a projected image provided on a screen by the touch projection system varies according to a distance between a projection apparatus and the screen, and the aforesaid method includes the following steps. A first light source and a second light source are provided through at least two light emitting apparatuses. An image frame is captured, wherein the image frame includes two light spots respectively formed by the first light source and the second light source, and the two light spots have a distance therebetween. The two light spots in the image frame are being detected to calculate the distance. The size of the projected image corresponding to the distance between the two light spots in the image frame is determined according to a look-up table. A sensitivity of a light detecting apparatus performing a touch detection on the projected image is adjusted according to the size of the projected image.

The embodiments of the invention may have one of the following benefits. In the embodiments of the invention, by disposing at least two light emitting apparatuses nearby the invisible light emitter to enable the light emitting apparatuses to emit fixed light sources (i.e., the first light source and the second light source) from positions close to the invisible light emitter and to respectively form two light spots in the image frame captured by the light detecting apparatus, the distance between the two light spots in the image frame can serve as a basis for effectively determining the size of the projected image, and thereby provides an adjustment of touch sensitivity according to the size of the projected image. Therefore, in case that the projected image is larger, the embodiments of the invention can provide more accurate touch detection.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In interactive projection technology, a size of a projected image may vary according to a movement of a projection apparatus. The embodiments of the invention as based on a system structure, in which the projection apparatus and a light detecting apparatus may move simultaneously and at least two light emitting apparatuses may be disposed nearby the projected image generated by the projection apparatus or nearby the invisible light emitter, enable the light emitting apparatuses to emit fixed light beams from positions close to the invisible light emitter and form two light spots in an image frame captured by the light detecting apparatus, for example. As such, a distance between the two light spots generated by the two light emitting apparatuses in the captured image frame can be used to calculate the size of the projected image, so that the sensitivity of the touch detection can be adjusted according to the different sizes of the projected images. For the better understanding of the invention, exemplary embodiments are described below with reference to accompanying drawings.

Figure 1:
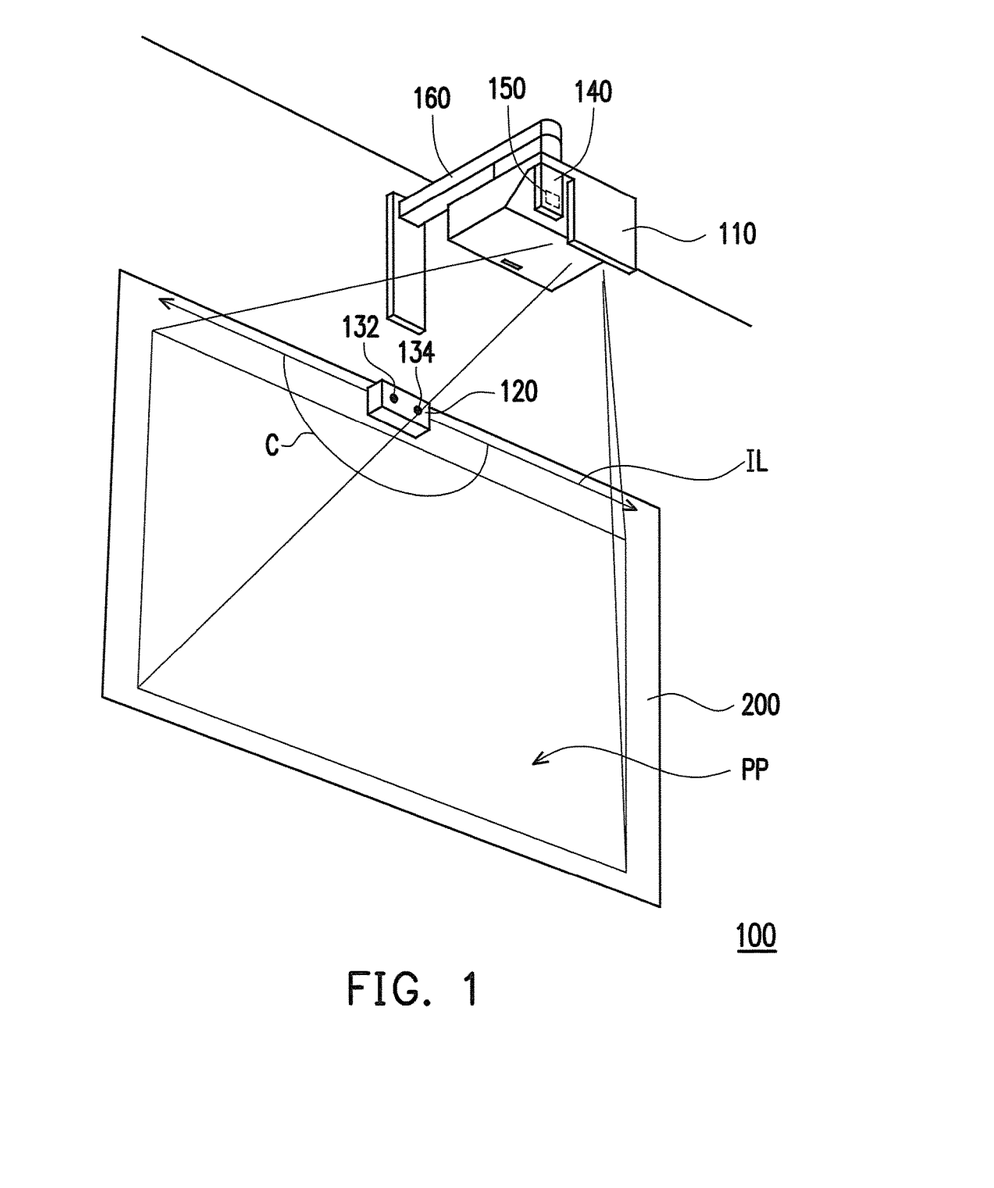
FIG. 1 is a schematic diagram illustrating a touch projection system according to an embodiment of the invention.

FIG. 1 is a schematic diagram illustrating a touch projection system according to an embodiment of the invention. Referring to FIG. 1, a touch projection system 100 includes a projection apparatus 110, an invisible light emitter 120, at least two light emitting apparatuses (for ease of illustration, light emitting apparatuses 132, 134 are schematically illustrated in FIG. 1), a light detecting apparatus 140 and a processing unit 150. The processing unit 150 is coupled to the projection apparatus 110 and the light detecting apparatus 140. In some embodiments, the processing unit 150 can be integrated with the light detecting apparatus 140 into one integrated apparatus. While, in other embodiments, the processing unit 150 can be independent to the light detecting apparatus 140 and be coupled to the light detecting apparatus 140 through wire connections, such as being disposed within the projection apparatus 110, but not limited thereto.

The projection apparatus 110 is, for example, an apparatus capable of projecting a projected image onto a screen for display, such as a liquid crystal display (LCD) projector, a digital light processor (DLP) projector or so forth. In the embodiment of FIG. 1, the projection apparatus 110 can project a projected image PP onto a screen 200. The screen 200 is, for example, a whitewall, a whiteboard or other display surfaces suitable for receiving the projected image PP.

The invisible light emitter 120 is, for example, a laser emitter (e.g., an infrared laser emitter) adapted to generate an invisible light curtain C parallel to the screen 200, cover the entire screen 200 and form a touch area corresponding to the projected image PP. The invisible light emitter 120 can be disposed at an edge position of the projected image PP, such as being disposed nearby a center position of the upper edge of the projected image PP. The invisible light emitter 120 emits an invisible light beam IL which diverges into the invisible light curtain C that is parallel to the screen 200. The invisible light curtain C covers the projected image PP to form the touch area. In the present embodiment, the invisible light curtain C at least covers the entire projected image PP, but the dispositional position of the invisible light emitter 120 and a divergence angle of the invisible light beam IL can determine a size of the invisible light curtain C; and the invention does not limit thereto. In addition, the invisible light emitter 120 may also generate the invisible light curtain C by using a method of generating a reflected light beam or by using other suitable optical elements, and the invention is also not limited thereto.

The light emitting apparatuses 132, 134 are, for example, two light-emitting diodes (Light Emitting Diode, LED) which are disposed nearby the projected image PP or disposed nearby the invisible light emitter 120. In the embodiment of FIG. 1, the light emitting apparatuses 132,134 are, for example, integrated onto the invisible light emitter 120, such as fixed onto a casing (unlabeled) of the invisible light emitter 120, and the light emitting apparatuses 132, 134 are spaced a distance apart to respectively form a first light source and a second light source. In some embodiments, taking into consideration that possible interference of ambient light during implementation may lead to misjudgement, the light emitting apparatuses 132, 134 as well as the first light source and the second light source, for example, may emit visible lights to provide the light detecting apparatus 140 for detection; however, in other embodiments, the light emitting apparatuses 132,134 may also emit visible lights, and the invention is not limited thereto. In the other embodiment of the invention, the light emitting apparatuses 132, 134 are disposed nearby the projected image PP. Specifically, the light emitting apparatuses 132, 134 may be disposed near to one side of top, bottom, left and right sides of the projected image PP without in the projected image PP. In other words, the light emitting apparatuses 132, 134 of the embodiment are disposed within a range capable for the light detecting apparatus 140 to capture the image frames, and the invention is not limited thereto.

The light detecting apparatus 140 is, for example, a camera, a video recorder or other image capturing apparatus. The light detecting apparatus 140 is disposed on the projection apparatus 110 and adapted to capture an image frame in a direction towards the screen 200. The image frame may include two light spots respectively formed by the first light source and the second light source and the projected image, and the two light spots have a distance therebetween. In other words, the light emitting apparatuses 132, 134 of the embodiment can be disposed within a range capable for the light detecting apparatus 140 to capture the image frame. In addition, the light detecting apparatus 140 may further be used to detect a reflected invisible light spot generated by a touch object (e.g., a user's finger, a pen or so forth) contacting the invisible light curtain C in the touch area so as to achieve a touch detection function, and thus the image frame captured by the light detecting apparatus 140 can practically cover the light emitting apparatuses 132, 134 and the touch area. Moreover, in the embodiment, the light detecting apparatus 140 and projection apparatus 110 can be integrated into one apparatus, or the light detecting apparatus 140 and the projection apparatus 110 may respectively be independent apparatuses, and the invention is not limited thereto.

In the embodiment, the projection apparatus 110 and the light detecting apparatus 140 can simultaneously move relative to the screen 200, while the invisible light emitter 120 and the light emitting apparatuses 132, 134 are disposed at fixed positions close to the screen 200. Therefore, the first light source and the second light source provided by the light emitting apparatuses 132, 134 can be considered as fixed light sources, and the distance between the two light spots in the image frame captured by the light detecting apparatus 140 can be determined according to relative positions between the light detecting apparatus 140 and the two light emitting apparatuses 132, 134. In simple terms, based on the aforementioned system configuration, when the projection apparatus 110 and the light detecting apparatus 140 are away from the screen 200, the distance between the two light spots in the image frame captured by the light detecting apparatus 140 is smaller, while when the projection apparatus 110 and the light detecting apparatus 140 are close to the screen 200, the distance between the two light spots in the image frame captured by the light detecting apparatus 140 is greater.

After the projection apparatus 110 and the light detecting apparatus 140 simultaneously moved relative to the screen 200, the light detecting apparatus 140 captures the image frame and transmits a signal corresponding to the image frame to the processing unit 150, the processing unit 150 receives the signal corresponding to the image frame from the light detecting apparatus 140 and calculates the distance between the two light spots in the image frame, and the processing unit 150 determines the size of the projected image PP corresponding to the distance according to a look-up table. According to the size of the projected image PP, the processing unit 150 may adjust a sensitivity of the light detecting apparatus 140 when a touch action performed on the projected image PP is detected by the light detecting apparatus 140. The embodiment of the invention uses the light emitting apparatuses 132, 134 to provide the fixed light beams so as to respectively form the two light spots in the image frame captured by the light detecting apparatus 140, and uses the distance between the two light spots to reflect the relative positions between the projection apparatus 110 and the screen 200, and thus is able to search in the look-up table for the size of the projected image PP corresponding to the distance between the two light spots in the image frame. In addition, the image frame captured by the light detecting apparatus 140 can be converted into a gray level value, the processing unit 150 can compare the gray level value corresponding to the image frame captured by the light detecting apparatus 140 with a predetermined gray level threshold value so as to determine whether there is a valid touch event point (namely, corresponding to a valid touch event) presented in the image frame, whereby the valid touch event point is a reflected light spot being generated when a user uses a touch object (e.g., a finger or a pen) to contact the invisible light curtain C in the touch area. If the gray level value corresponding to the image frame is greater than the gray level threshold value, then a coordinate position corresponding to the gray level value in the image frame can be determined as a valid touch event point, while if the gray level value corresponding to the image frame is not greater than the gray level threshold value, then it is determined as a not a touch point (namely, corresponding to an invalid touch event, or no contact has occurred). Therefore, through adjusting the gray level threshold value used for determining the valid touch event, the processing unit 150 can correspondingly adjust the sensitivity of the light detecting apparatus 140 performing the touch detection on the projected image PP.

Herein, the processing unit 150 is, for example, a central processing unit (CPU), a programmable microprocessor for general purpose or special purpose use, a digital signal processor (DSP), a programmable controller, an application specific integrated circuits (ASIC), a programmable logic device (PLD), other similar device or a combination of the above.

In addition, the touch projection system 100 can further include a storage unit (not shown), which can be used to store the look-up table and is accessible by the processing unit 150. In some of the embodiments, the storage unit can be built in the light detecting apparatus 140, that is, the light detecting apparatus 140 can further includes a storage unit or be built in the projection apparatus 110. In other embodiments, the storage unit can be independent from storage devices of the light detecting apparatus 140 and the processing unit 150, and can be electrically connected to the light detecting apparatus 140 and the processing unit 150. The storage unit is, for example, any type of a fixed or movable random access memory (RAM), a read-only memory (ROM), a flash memory, a hard drive, other similar devices, or a combination of the above.

Figure 2:
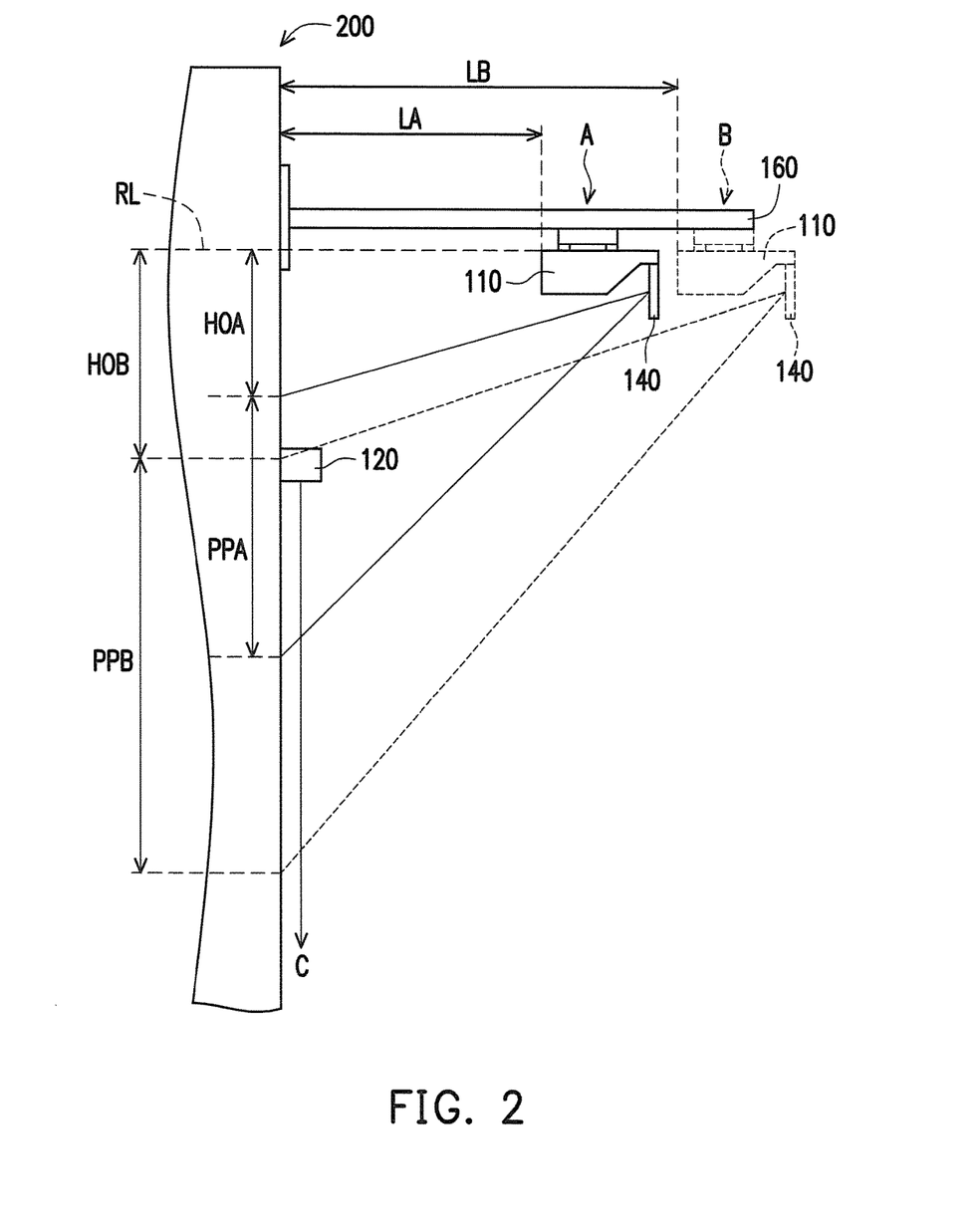
FIG. 2 is a side view diagram of the touch projection system of FIG. 1.

Actuation modes of the touch projection system 100 will be described in details below. Referring to FIG. 2, FIG. 2 is a side view diagram of the touch projection system of FIG. 1. The light emitting apparatuses 132, 134 may be integrated onto the surface of the invisible light emitter 120, and for the ease of understanding the figure, the annotations for the light emitting apparatuses 132, 134 are omitted in the side view diagram of FIG. 2. In addition, the annotation for the processing unit 150 is also omitted in FIG. 2.

In details, the size of the projected image provided by the projection apparatus 110 on the screen 200 can vary according to a distance between the projection apparatus 110 and the screen 200. In the embodiment of FIG. 2, when the projection apparatus 110 and the light detecting apparatus 140 move to a position A, the projection apparatus 110 projects a projected image PPA onto the screen 200. When the projection apparatus 110 and the light detecting apparatus 140 move from the position A to a position B along a direction perpendicular to the screen 200 and away from the screen 200, the projection apparatus 110 projects a projected image PPB onto the screen 200. If the projection apparatus 110 projects the projected image with the same projection angle, then, in this embodiment, a size of the projected image PPB would be greater than a size of the projected image PPA.

In addition, the distance between the two light spots respectively formed by the light emitting apparatuses 132, 134 in the image frame can also be varied according to the simultaneously movements of the projection apparatus 110 and the light detecting apparatus 140. Thus, the touch projection system 100 of the embodiment, before performing an adjustment of the touch sensitivity, firstly moves the projection apparatus 110 to a different position along a direction perpendicular to the screen 200 and away from the screen 200, wherein the light detecting apparatus 140 respectively captures a plurality of sampling image frames at different positions, and the processing unit 150 measures a plurality of distances respectively corresponding to a plurality of light spots in the sampling image frames and calculates a plurality of sampling image frame sizes respectively corresponding to the plurality of distances so as to establish a look-up table for the size of the projected image PP corresponding to the distance between the two light spots in the image frame. In particular, the look-up table is a relationship between the size of the projected image projected by the projection apparatus and the distances between the two light spots formed by the light emitting apparatuses in the image frame captured by the light detecting apparatus.

Specifically, during the pre-operation period, the processing unit 150 can obtain a plurality of sampling image frame sizes corresponding to a plurality of different sampling projected images according to the different distances between the projection apparatus 110 and the screen 200. Herein, if the distance between the projection apparatus 110 and the screen 200 is defined as a distance from the casing of the projection apparatus 110 to the screen 200 (for instance, in FIG. 2: when the projection apparatus 110 is located at the position A, the distance between the projection apparatus 110 and the screen 200 is LA; when the projection apparatus 110 is located at the position B, the distance between the projection apparatus 110 and the screen 200 is LB; and the size of the projected image PP is represented by a diagonal length of a projected image with an aspect ratio of 16:9), then a corresponding relationship between the distance between the projection apparatus 110 and the screen 200 and the sampling image frame size of the sampling projected image is a shown in Table 1 below.

TABLE 1

| Sampling image frame size (unit: inch) | Distance between projection apparatus and screen (unit: mm) | Offset of projected image (unit: mm) |
| --- | --- | --- |
| 70 | 138.5 | 236.0 |
| 75 | 166.2 | 248.3 |
| 80 | 193.9 | 260.7 |
| 85 | 221.6 | 273.0 |
| 90 | 249.3 | 285.4 |
| 95 | 277.0 | 297.7 |
| 100 | 304.7 | 310.1 |
| 105 | 332.4 | 322.4 |
| 110 | 360.1 | 334.8 |
| 115 | 387.8 | 347.1 |
| 120 | 415.5 | 359.5 |

Table 1 further shows the offsets of the projected image that are respectively corresponding to the different distances between projection apparatus 110 and the screen 200. Herein, by using a projection line extending from a junction between the casing of the projection apparatus 110 and a fixing bracket 160 onto the screen 200 as a reference line RL, on the screen 200, a distance formed between the reference line RL and the upper edge of the projected image is defined as the offset of the projected image. For instance, in the embodiment of FIG. 2, when the projection apparatus 110 is located at the position A, the upper edge of the projected image PPA projected onto the screen 200 has an offset HOA with respect to the reference line RL, and when the projection apparatus 110 is located at the position B, the upper edge of the projected image PPB projected on the screen 200 has an offset HOB with respect to the reference line RL.

Next, the light detecting apparatus 140 can perform image capturing on the different sampling projected images, respectively, so as to obtain a plurality of sampling image frames. Afterwards, the processing unit 150 can detect the two sampling light spots respectively formed by the light emitting apparatuses 132, 134 in each of the sampling image frames, so as to calculate the respective corresponding sampling distance in each of the different sampling image frames and to establish the look-up table according to the different sampling image frame sizes and the sampling distances.

Figure 3:
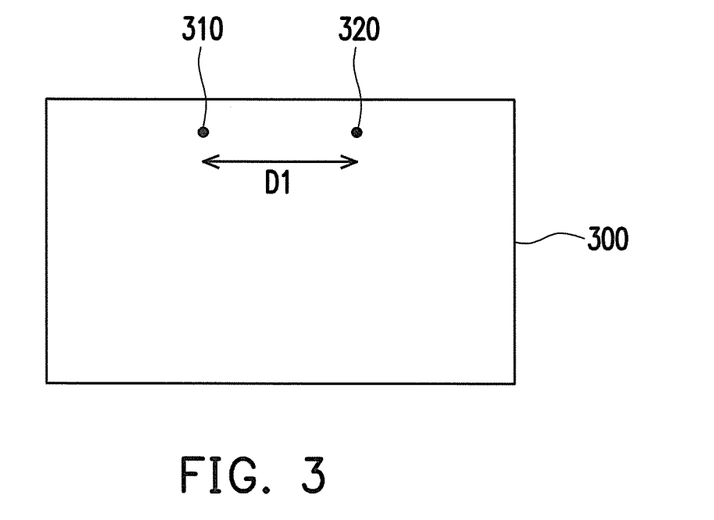
FIG. 3 and FIG. 4 are respectively a schematic diagram illustrating an image frame according to an embodiment of the invention.
Figure 4:
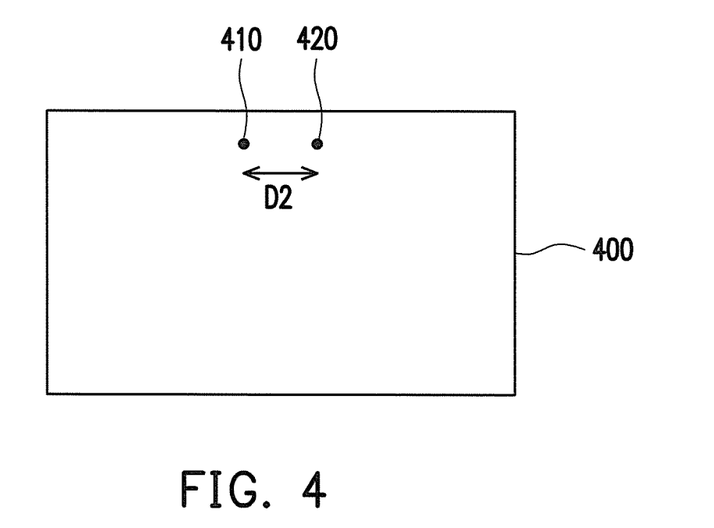

For instance, FIG. 3 and FIG. 4 are respectively schematic diagrams illustrating an image frame according to an embodiment of the invention. Referring to FIG. 2 and FIG. 3 first, when the projection apparatus 110 and the light detecting apparatus 140 are located at the position A, the processing unit 150 can obtain a first sampling image frame size, such as 85 inches, of a first sampling projected image under the distance LA. In addition, the light detecting apparatus 140 can capture a sampling image frame 300 from the first sampling projected image, and the processing unit 150 can detect light spots 310, 320 respectively formed by the light emitting apparatuses 132, 134 in the sampling image frame 300 and calculate a sampling distance D1, such as 51 pixel units, between the light spots 310, 320 in the sampling image frame 300.

Similarly, referring to FIG. 2 and FIG. 4, when the projection apparatus 110 and the light detecting apparatus 140 move to the position B, the processing unit 150 can obtain a second sampling image frame size, such as 110 inches, of a second sampling projected image under the distance LB. In addition, the light detecting apparatus 140 can capture a sampling image frame 400 from the second sampling projected image, and the processing unit 150 can detect light spots 410, 420 respectively formed by the light emitting apparatuses 132, 134 in the sampling image frame 400 and calculate a sampling distance D2, such as 38 pixel units, between the light spots 410, 420 in the sampling image frame 400.

Accordingly, after executing the aforementioned sampling actions for several times, the embodiment can obtain multiple sets of sampling image frame sizes and the corresponding sampling distances in sampling image frames for being recorded in the look-up table. Afterwards, when the processing unit 150 calculates the distance between the light spots through the image frame captured by the light detecting apparatus 140, the processing unit 150 can search from the look-up table to find out the size of the projected image PP currently being projected onto the screen 200 by the projection apparatus 110 according to the distance between the light spots in the image frame, and thereby perform the subsequent touch sensitivity adjusting actions.

It is worth mentioning that, in some embodiments, the sampling image frame size of each of the sampling projected images recorded in the look-up table may be a largest size of the projected image under the corresponding distance between the projection apparatus 110 and the screen 200. In detail, in one embodiment, a projection angle of the projection apparatus 110 which is used for providing the projected image PP can be adjusted, that is, the projection angle can be considered as a scaling ratio of the size of the projected image PP and is used for scaling the size of the projected image PP. Under such condition, the processing unit 150 can, for example, sample a size (i.e., the largest size of the projected image PP) of the projected image PP provided by the projection apparatus 110 under the largest projection angle and record it into the look-up table.

As for the method regarding how the processing unit 150 adjusts the sensitivity of light detecting apparatus 140 performing the touch detection on the projected image PP, in one embodiment, the processing unit 150, for example, determines a threshold value of the light detecting apparatus 140 according to the size of the projected image PP. According to the threshold value, whether a valid touch event has occurred on the touch area of the corresponding projected image PP can be determined. If the processing unit 150 reduces the threshold value, then the sensitivity of the light detecting apparatus 140 performing detection on the projected image PP is correspondingly increased, that is, after the light detecting apparatus 140 captures the image frame, the processing unit 150 determines whether there is a valid touch event according to the lowered threshold value; and if the processing unit 150 increases the threshold value, then the sensitivity of the light detecting apparatus 140 performing detection on the projected image PP is correspondingly reduced, that is, after the light detecting apparatus 140 captures the image frame, the processing unit 150 determines whether there is a valid touch event according to the raised threshold value. The threshold value is, for example, a gray level threshold value, and the magnitude of the gray level value can correspond to a light intensity corresponding to the image frame captured by the light detecting apparatus 140.

As such, the embodiments of the invention, after accurately obtaining the size of the projected image PP, can further correspondingly adjust the gray level threshold value used for determining the valid touch event according to the size of the projected image PP so as to increase or decrease the sensitivity of the light detecting apparatus 140 performing detection on the projected image PP. Hence, an influence of the size of the projected image PP on the touch detection can be lowered, and thereby resolving the problem of having poor touch sensitivity due to the invisible light curtain C formed by the invisible light beam IL getting farther away from the invisible light emitter 120 and causing the light intensity to become lower when the projected image PP is relatively large, so that a favorable usage experience can be provided.

The previous embodiment can timely adjust the sensitivity of the touch detection performed by the touch projection system 100 based on the sensitivity of the light detecting apparatus 140, automatically, and can be applied during an initialization phase or a calibration phase of the touch projection system 100. Herein, the initialization phase or the calibration phase is, for example, a period during which the touch projection system 100 is already supplied with power but the invisible light emitter 120 is not yet activated (that is, the invisible light emitter 120 has not yet generated the invisible light curtain C). When the invisible light emitter 120 generates the invisible light curtain C corresponding to the projected image PP (that is, when the touch projection system 100 can execute a touch detection), the light detecting apparatus 140 can detect the reflected light generated by the touch object contacting the invisible light curtain C in the touch area, and the processing unit 150 can determine whether the reflected light corresponds a valid touch event by comparing a light intensity of the reflected light in the image frame captured by the light detecting apparatus 140 with the threshold value. When the reflected light spot in the image frame is determined as a valid touch event, the processing unit 150 can generate touch information corresponding to the touch object in the projected image PP or execute a corresponding interactive operation. More specifically, if the processing unit 150 detects the touch object and the light intensity of the reflected light is greater than the threshold value, then the operation of the touch object in the touch area can be determined as a valid touch event. Therefore, the processing unit 150 can generate coordinate information corresponding to the touch object in the projected image PP, and execute a corresponding function according to the coordinate information and the touch operation. The touch object is, for example, the user's finger, a pen or an object capable of reflecting invisible light, and the invention is not limited thereto. As for a condition that the light intensity of the reflected invisible light is not greater than the threshold value, the processing unit 150 can determine that no valid touch event has occurred, and thus no corresponding touch information will be generated. The processing unit 150 may transmit the touch information to the original image source (not shown) for changing the projected images displayed to the screen 200. The original image source, for example, is a personal computer, a smartphone or a laptop, etc. to provide the image information/data to the projection apparatus 110.

It is worth mentioning that, in the previous embodiment, the processing unit 150, for example, identifies the gray level values respectively converted from the light spots formed by the light emitting apparatuses 132, 134 in the image frame according to the gray level threshold value. In other embodiments, the light emitting apparatuses 132, 134 can form an arrow or other identification symbols of specific shape in the image frame, and thus the processing unit 150 can identify the identification symbols in the image frame through an image recognition technology so as to calculate a distance between the identification symbols and obtain the size of the projected image PP.

Figure 5:
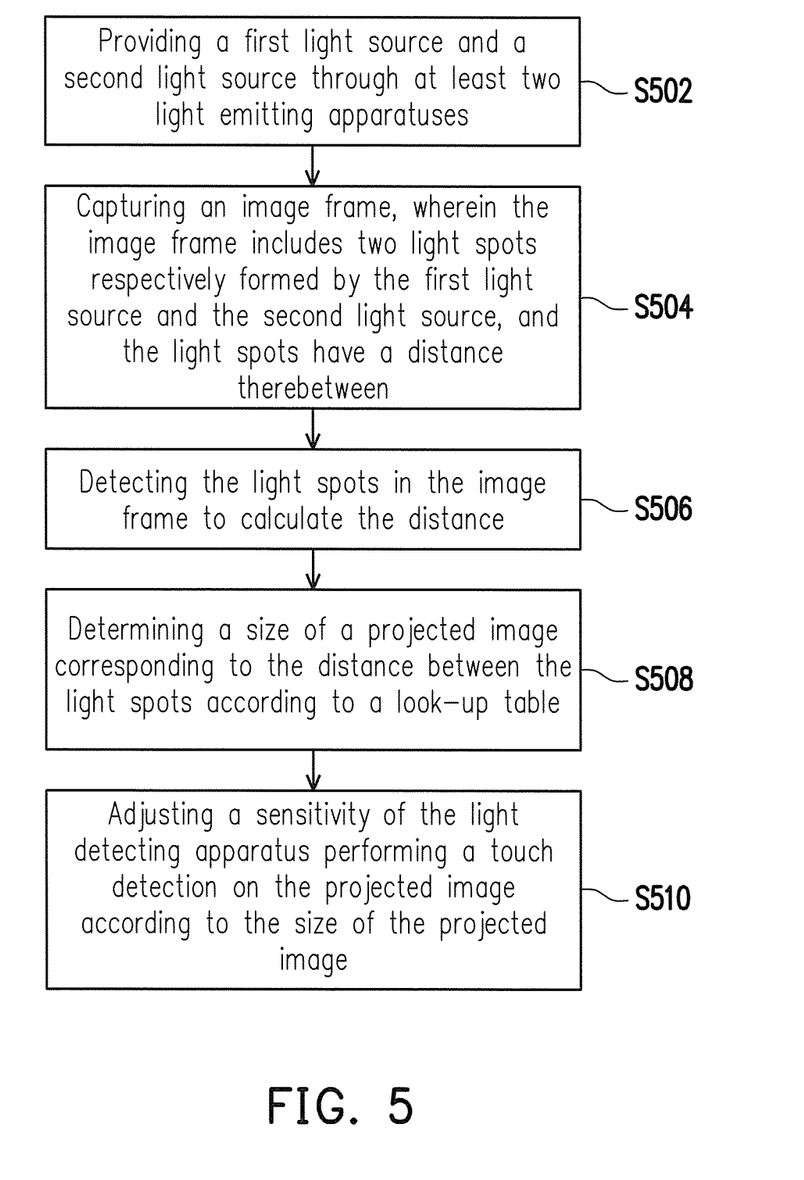
FIG. 5 is a flow chart illustrating a touch sensitivity adjusting method of a touch projection system according to an embodiment of the invention.

From another perspective, the invention provides a touch sensitivity adjusting method of a touch projection system. Referring to FIG. 5, FIG. 5 is a flowchart illustrating a touch sensitivity adjusting method of a touch projection system according to an embodiment of the invention. In step S502, a first light source and a second light source are provided through at least two light emitting apparatuses. In step S504, an image frame is captured, wherein the image frame includes two light spots respectively formed by the first light source and the second light source, and the light spots have a distance therebetween. In step S506, the light spots in the image frame are being detected to calculate the distance. In step S508, a size of a projected image corresponding to the distance between the light spots is determined according to a look-up table. In step S510, a sensitivity of the light detecting apparatus performing touch detection on the projected image is adjusted according to the size of the projected image.

In summary, the embodiments of the invention may have one of the following benefits. In the embodiments of the invention, by using the at least two light emitting apparatuses disposed nearby the invisible light emitter to provide the fixed light sources to form the two light spots in the image frame captured by the light detecting apparatus and by using the distance between the two light spots in the image frame to provide a basis for determining the size of the projected image, the embodiments of the invention can effectively obtain the size of the projected image and can correspondingly adjust the sensitivity of the light detecting apparatus performing the touch detection on the projected image according to the size of the projected image. In addition, the embodiments of the invention can timely adjust the touch sensitivity automatically during the touch detection, and can also perform in advance a calibration to the touch sensitivity during the initialization phase of the touch projection system. In some embodiments, the light detecting apparatus, the processing unit and the storage unit can further be integrated into an integrated apparatus. For example, the processing unit and the storage unit may be built in the light detecting apparatus. As a result, the light detecting apparatus can operate independently and communications between different apparatuses can be reduced, thereby enabling the adjustment of the touch sensitivity based on the sensitivity of the light detecting apparatus for detecting the reflected light from the touch object to be more efficient.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch projection system, comprising:
   a projection apparatus, adapted to provide a projected image on a screen, wherein a size of the projected image varies according to a distance between the projection apparatus and the screen;
   an invisible light emitter, adapted to generate an invisible light curtain parallel to the screen and form a touch area corresponding to the projected image;
   at least two light emitting apparatuses, adapted to form a first light source and a second light source for generating fixed light beams;
   a light detecting apparatus, disposed on the projection apparatus and adapted to capture an image frame, wherein the image frame comprises two light spots respectively formed by the first light source and the second light source and the projected image, and wherein the two light spots have a distance therebetween; and
   a processing unit, coupled to the projection apparatus and the light detecting apparatus, wherein the light detecting apparatus is adapted to transmit a signal corresponding to the image frame to the processing unit, and the processing unit is adapted to calculate the distance between the two light spots in the image frame, and wherein the processing unit is adapted to determine the size of the projected image corresponding to the calculated distance according to a look-up table, and the processing unit is adapted to adjust a sensitivity of the light detecting apparatus for performing a touch detection on the projected image according to the determined size of the projected image.

2. The touch projection system according to claim 1, wherein the projection apparatus and the light detecting apparatus simultaneously move along a direction perpendicular to the screen, and the distance between the two light spots in the image frame is determined according to relative positions of the light detecting apparatus and the at least two light emitting apparatuses.

3. The touch projection system according to claim 1, wherein the at least two light emitting apparatuses are integrated onto the invisible light emitter, and the at least two light emitting apparatuses comprise two light-emitting diodes for respectively forming the first light source and the second light source.

4. The touch projection system according to claim 1, wherein the at least two light emitting apparatuses are disposed nearby the projected image, and the at least two light emitting apparatuses comprise two light-emitting diodes for respectively forming the first light source and the second light source.

5. The touch projection system according to claim 1, wherein the processing unit is adapted to determine a threshold value of the light detecting apparatus according to the size of the projected image, to adjust the sensitivity of the light detecting apparatus, and wherein the threshold value is used to determine whether a valid touch event is occurred on the touch area of the corresponding projected image.

6. The touch projection system according to claim 5, wherein if the processing unit reduces the threshold value, the sensitivity of the light detecting apparatus performing the touch detection on the projected image is increased, and if the processing unit increases the threshold value, the sensitivity of the light detecting apparatus performing the touch detection on the projected image is reduced.

7. The touch projection system according to claim 5, wherein when the invisible light emitter is adapted to generate the invisible light curtain corresponding to the projected image, the light detecting apparatus is further adapted to detect a reflected invisible light generated by a touch object contacting the invisible light curtain in the touch area, and wherein the processing unit is adapted to determine whether the reflected light corresponds to the valid touch event by comparing a light intensity of the reflected light in the image frame with the threshold value, wherein when the reflected light corresponds to the valid touch event, the processing unit is adapted to generate a touch information corresponding to the touch object in projected image.

8. The touch projection system according to claim 1, wherein the invisible light curtain covers the projected image to form the touch area, and the image frame captured by the light detecting apparatus covers the at least two light emitting apparatuses and the touch area.

9. The touch projection system according to claim 1, wherein the look-up table is a relationship between the size of the projected image projected by the projection apparatus and the distances between the two light spots formed by the light emitting apparatuses in the image frame captured by the light detecting apparatus.

10. The touch projection system according to claim 1, wherein the light detecting apparatus comprises a storage unit, and the storage unit is adapted to store the look-up table.

11. A touch sensitivity adjusting method of a touch projection system, the touch projection system comprising a screen, a projection apparatus and a light detecting apparatus disposed on the projection apparatus, wherein a size of a projected image provided on the screen by the touch projection apparatus varies according to a distance between the projection apparatus and the screen, and the touch sensitivity adjusting method comprises:

providing an invisible light emitter, adapted to generate an invisible light curtain parallel to the screen and form a touch area corresponding to the projected image;

providing a first light source and a second light source through at least two light emitting apparatuses for generating fixed light beams;

capturing an image frame by the light detecting apparatus, wherein the image frame comprises two light spots respectively formed by the first light source and the second light source and the projected image, and the two light spots have a distance therebetween;

detecting the two light spots in the image frame to calculate the distance between the two light spots in the image frame;

determining the size of the projected image corresponding to the calculated distance between the two light spots in the image frame according to a look-up table; and adjusting a sensitivity of the light detecting apparatus for performing a touch detection on the projected image according to the determined size of the projected image.

12. The touch sensitivity adjusting method of the touch projection system according to claim 11, wherein the projection apparatus and the light detecting apparatus simultaneously move along a direction parallel to the screen, wherein the distance between the two light spots in the image frame is determined according to relative positions between the light detecting apparatus and the at least two light emitting apparatuses.

13. The touch sensitivity adjusting method of the touch projection system according to claim 11, wherein the at least two light emitting apparatuses is integrated onto the invisible light emitter, and the at least two light emitting apparatuses comprise two light-emitting diodes for respectively providing the first light source and the second light source.

14. The touch sensitivity adjusting method of the touch projection system according to claim 13, wherein the step of providing the touch area corresponding to the projected image comprises:

enabling the invisible light curtain to cover the projected image so as to form the touch area, and enabling the image frame to cover the at least two light emitting apparatuses and the touch area.

15. The touch sensitivity adjusting method of the touch projection system according to claim 11, wherein the steps of adjusting the sensitivity of the light detecting apparatus for performing a touch detection on the projected image according to the determined size of the projected image comprises:

determining a threshold value of the light detecting apparatus according to the size of the projected image to adjust the sensitivity of the light detecting apparatus, wherein the threshold value is used to determine whether a valid touch event is occurred on the touch area of the corresponding projected image.

16. The touch sensitivity adjusting method of the touch projection system according to claim 15, wherein if the threshold value is reduced, the sensitivity of the light detecting apparatus performing the touch detection on the projected image is correspondingly increased, and if the threshold value is increased, the sensitivity of the light detecting apparatus performing the touch detection on the projected image is correspondingly reduced.

17. The touch sensitivity adjusting method of the touch projection system according to claim 15, wherein the steps of adjusting the sensitivity of the light detecting apparatus for performing the touch detection on the projected image according to the determined size of the projected image further comprise:

generating the invisible light curtain parallel to the screen and correspondingly forming the touch area to the projected image;

detecting a reflected light generated by a touch object contacting the invisible light curtain in the touch area;

determining whether the reflected light corresponds to the valid touch event by comparing a light intensity of the reflected light in image frame with the threshold value; and     generating a touch information corresponding to the touch object in projected image when the reflected light corresponds the valid touch event.

18. The touch sensitivity adjusting method of the touch projection system according to claim 11, further comprising:

during a pre-operation period, obtaining a plurality of sampling image frame sizes of a plurality of different sampling projected images according to different distances between the projection apparatus and the screen;

capturing a plurality of sampling image frames respectively from the different sampling projected images;

detecting two sampling light spots respectively formed in the sampling image frames by the at least two light emitting apparatuses, so as to calculate a plurality of sampling distances respectively corresponding to the different sampling image frames; and     establishing the look-up table according to the different sampling image frame sizes and the sampling distances.

19. The touch sensitivity adjusting method of the touch projection system according to claim 18, wherein the sampling image frame size of each of the sampling projected images is a largest size projectable under the corresponding distance between the projection apparatus and the screen.

\* \* \* \* \*